US010773821B2

(12) United States Patent
Bolukbasi et al.

(10) Patent No.: US 10,773,821 B2
(45) Date of Patent: Sep. 15, 2020

(54) ENERGY ABSORBING COMPOSITE PANELS

(71) Applicant: The Boeing Company, Chicago, IL (US)

(72) Inventors: Akif O. Bolukbasi, Mesa, AZ (US); Timothy R. Gleason, Mesa, AZ (US); Peter Holemans, Sewell, NJ (US)

(73) Assignee: The Boeing Company, Chicago, IL (US)

( * ) Notice: Subject to any disclaimer, the term of this patent is extended or adjusted under 35 U.S.C. 154(b) by 374 days.

(21) Appl. No.: 15/937,414

(22) Filed: Mar. 27, 2018

(65) Prior Publication Data

US 2019/0300195 A1 Oct. 3, 2019

(51) Int. Cl.
| | |
|---|---|
| *B64D 37/32* | (2006.01) |
| *B32B 1/02* | (2006.01) |
| *B32B 3/28* | (2006.01) |
| *B32B 5/14* | (2006.01) |
| *B32B 5/18* | (2006.01) |
| *B32B 15/20* | (2006.01) |
| *B32B 27/32* | (2006.01) |
| *B32B 7/022* | (2019.01) |
| *B64C 1/00* | (2006.01) |
| *B32B 3/30* | (2006.01) |
| *B32B 5/26* | (2006.01) |
| *B60K 15/03* | (2006.01) |
| *B32B 3/18* | (2006.01) |
| *B32B 5/24* | (2006.01) |
| *B32B 15/04* | (2006.01) |
| *B32B 27/06* | (2006.01) |
| *B64D 37/02* | (2006.01) |
| *B60K 15/063* | (2006.01) |

(52) U.S. Cl.
CPC ............... *B64D 37/32* (2013.01); *B32B 1/02* (2013.01); *B32B 3/18* (2013.01); *B32B 3/28* (2013.01); *B32B 3/30* (2013.01); *B32B 5/145* (2013.01); *B32B 5/18* (2013.01); *B32B 5/245* (2013.01); *B32B 5/26* (2013.01); *B32B 7/022* (2019.01); *B32B 15/046* (2013.01); *B32B 15/20* (2013.01); *B32B 27/065* (2013.01); *B32B 27/32* (2013.01); *B60K 15/03* (2013.01); *B60K 15/03177* (2013.01); *B64C 1/00* (2013.01); *B64D 37/02* (2013.01); *B32B 2250/40* (2013.01); *B32B 2260/023* (2013.01); *B32B 2260/046* (2013.01); *B32B 2262/106* (2013.01); *B32B 2266/06* (2013.01); *B32B 2266/08* (2013.01); *B32B 2305/022* (2013.01); *B32B 2307/558* (2013.01); *B32B 2307/56* (2013.01); *B32B 2439/40* (2013.01); *B32B 2605/18* (2013.01); *B60K 2015/03407* (2013.01); *B60K 2015/0631* (2013.01); *B60Y 2200/50* (2013.01); *B60Y 2306/01* (2013.01); *B64D 2037/325* (2013.01)

(58) Field of Classification Search
CPC .. B64D 37/32; B64D 37/02; B64D 2037/325; B32B 1/02; B32B 3/28; B32B 5/145; B32B 5/18; B32B 15/20; B32B 27/32; B32B 7/022; B32B 3/30; B32B 5/26; B32B 3/18; B32B 5/245; B32B 15/046; B32B 27/065; B32B 2305/022; B32B 2307/56; B32B 2439/40; B32B 2605/18; B32B 2260/046; B32B 2266/06; B32B 2260/023; B32B 2307/558; B32B 2250/40; B32B 2266/08; B32B 2262/106; B64C 1/00; B60K 15/03; B60K 15/03177; B60K 2015/03407; B60K 2015/0631; B60Y 2200/50
See application file for complete search history.

(56) References Cited

U.S. PATENT DOCUMENTS

2014/0120317 A1 5/2014 Zafiris et al.

FOREIGN PATENT DOCUMENTS

NL 2016206 B1 8/2017

OTHER PUBLICATIONS

European Search Report; Application 19164176.0-1107; dated Jul. 26, 2019.

Primary Examiner — Michael C Miggins
(74) Attorney, Agent, or Firm — Duft & Bornsen, PC

(57) ABSTRACT

Typical composite panels are brittle and unable to support transverse pressure loads that might be imposed on the panels. For example, the use of typical panels around fuel tanks of a vehicle are unable to support transverse pressure loads that might be imposed on the fuel tanks during a crash of the vehicle or a ballistic impact to the fuel tanks. In the embodiments described herein, panels include face sheets that are bonded to a foam core. The foam core includes a corrugated core sheet that is formed from a highly ductile material, such as Polyethylene or Aluminum. When a transverse pressure load is imposed on the panel, core crush of the foam occurs as the core sheet elongates from its original corrugated shape to a curve shape during deformation. This allows the panel to dissipate the energy of the transverse pressure load applied to the panel.

23 Claims, 7 Drawing Sheets

INITIAL DEFORMATION

INTERMEDIATE DEFORMATION

NEAR FINAL DEFORMATION

INITIAL DEFORMAION

INTERMEDIATE DEFORMATION

NEAR FINAL DEFORMATION

ENERGY ABSORBING COMPOSITE PANELS

STATEMENT REGARDING FEDERALLY SPONSORED RESEARCH OR DEVELOPMENT

This invention was made with Government support under contract number W911W6-16-2-0002 awarded by the Department of Defense. The Government has certain rights in this invention.

FIELD

This disclosure relates to the field of composite panels and in particular, to energy absorbing composite panels.

BACKGROUND

Aircraft are designed to provide crash protection for the occupants. This is normally accomplished by absorbing the impact energy imposed on the aircraft using airframe structures as well as crashworthy subsystems such as seats and landing gears. In addition to providing energy absorption, the airframe structures are designed to maintain their structural integrity, to provide a livable volume around the occupants during the crash, and to facilitate post-crash egress of the occupants from the aircraft. Military aircraft are also designed to withstand ballistic impacts without experiencing catastrophic structural failures. The airframe structure around internal fuel bladders of the aircraft as well as the belly structure are subjected to very high transverse pressure loads during the crash impacts. Ballistic impacts on the internal fuel bladders can also cause high transverse pressure loads on the surrounding airframe structure.

Many modern aircraft utilize composite structures to reduce the weight of the aircraft. However, typical composite structures utilize graphite face sheets with phenolic resin cores or solid laminates, which are brittle. Because they are brittle, these types of composite structures around internal fuel tanks rapidly fail under transverse pressure loads that occur during aircraft crashes and/or ballistic impacts on fuel tanks. Structural failures can have catastrophic effects on occupant survivability. These structural failures expose the occupants to potential injuries from major mass items such as engines, transmissions, and rotor systems due to a failed primary load path. Similar failures are also observed during ballistic tests of the fuel tanks and surrounding structures.

Another potential failure location of the composite structures is the aircraft belly skin panels. These skin failures occur particularly on crash impacts on soft soil and water. As the skins fail and rupture under transverse pressure loads, the impact loads are not transferred to the subfloor frame and keel beam structures that are part of the airframe energy absorption system. This results in higher airframe crash decelerations which can result in occupant spinal injuries. Furthermore, during crash impacts on water, rupture of the belly skin panels can lead to rapid sinking of the aircraft before the occupants can safely egress. Therefore, there is a need to improve the transverse pressure load capability of composite structures, such as the composite structures that might be used on aircraft.

SUMMARY

Modern vehicles often utilize composite panels as construction elements. Composite panels typically include multiple layers of materials that are bonded together, resulting in a strong, yet light weight structure. One example of a composite panel utilizes a low-density core with a skin panel bonded to each side of the core. The core may include a honeycomb structure or some other material, such as open or closed cell foam, and may include other reinforcing structures such as pins, as exemplified by X-Cor® pin pultruded Rohacell® foam. The skin panels may utilize lightweight materials such as carbon-graphite or fiberglass. Composite panels are desirable as construction materials due to their light weight and strength. However, typical composite panels are brittle and unable to support transverse pressure loads that might be imposed during a crash of the vehicle or a ballistic impact to the composite panels. For example, the use of typical composite panels around fuel tanks of a vehicle are unable to support transverse pressure loads that might be imposed on the fuel tanks during a crash of the vehicle or a ballistic impact to the fuel tanks. In the embodiments described herein, composite panels include face sheets that are bonded to a foam core. The foam core includes a corrugated core sheet that is formed from a highly ductile material, such as Polyethylene or Aluminum. When a transverse pressure load is imposed on the composite panel, core crush of the foam occurs as the core sheet elongates from its original corrugated shape to a curve shape during deformation. This allows the composite panel to dissipate the energy of the transverse pressure load applied to the composite panel.

One embodiment comprises a composite panel that includes a first composite laminate, a second composite laminate, and a foam core bonded to and interposed between the first composite laminate and the second composite laminate. The composite panel further includes a corrugated foam core sheet within the foam core. The corrugated core sheet has a higher ductility than the first composite laminate and the second composite laminate to absorb energy upon a transverse pressure load imposed on the composite panel.

Another embodiment comprises a composite structure for a vehicle. The composite structure includes a plurality of interconnected composite panels, where at least one of the plurality of interconnected composite panels is comprised of a first composite laminate, a second composite laminate, a foam core bonded to and interposed between the first composite laminate and the second composite laminate, and a corrugated core sheet within the foam core. The corrugated core sheet has a higher ductility than the first composite laminate and the second composite laminate to absorb energy upon a transverse pressure load imposed on the at least one of the plurality of interconnected composite panels.

Another embodiment comprises a composite fuel tank that includes an internal fuel bladder and a composite structure that encapsulates the internal fuel bladder. The composite structure includes a plurality of interconnected composite panels, where at least one of the plurality of interconnected composite panels is comprised of a first face sheet, a second face sheet, a foam core bonded to and interposed between the first face sheet and the second face sheet, and a corrugated core sheet within the foam core. The corrugated core sheet has a higher ductility than the first face sheet and the second face sheet to absorb energy upon a transverse pressure load imposed on the at least one of the plurality of interconnected composite panels.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
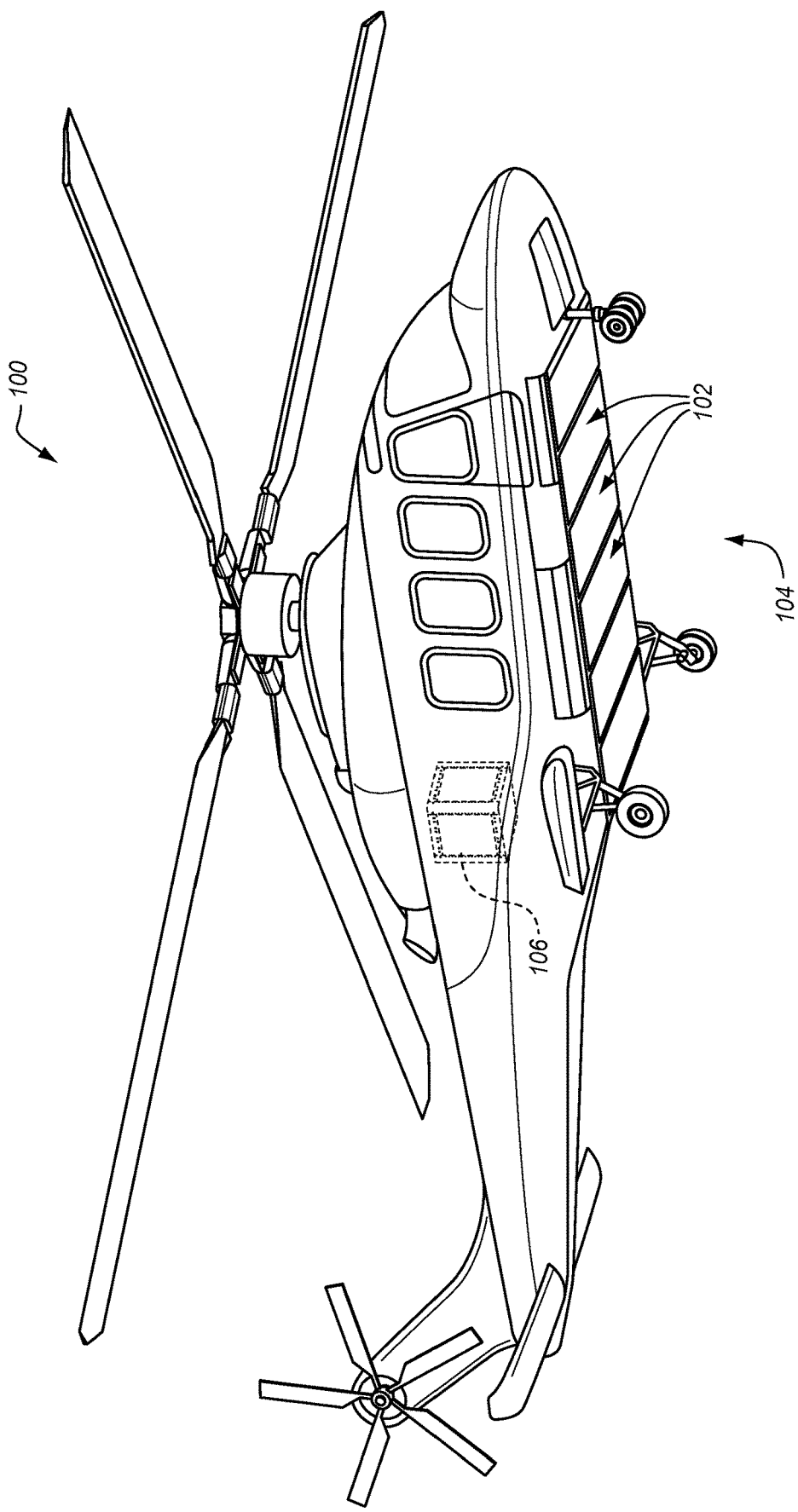
FIG. 1 is perspective view of a vehicle in an illustrative embodiment.

FIG. 1 is a perspective view of a vehicle 100 in an illustrative embodiment. Although FIG. 1 illustrates vehicle 100 as a rotorcraft, vehicle 100 may include other types of vehicles in other embodiments. For instance, vehicle 100 may comprise other types of aircraft or spacecraft (e.g., rotorcraft, manned or unmanned fighters, unmanned drone aircraft, etc.), other types of land vehicles (e.g., automobiles, tanks, etc.), and/or other types of underwater vehicles (e.g., submarines, Autonomous Underwater Vehicles (UAVs), etc.).

In FIG. 1, vehicle 100 is illustrated as including a composite panel 102. For example, composite panel 102 may be one of a plurality of composite panels that are interconnected together to form a structural component (e.g., part of a composite structure) for vehicle 100. A structural component is load-bearing. Some examples of structural components for vehicle 100 include wings, stabilizers, a fuselage, a tail boom of a rotorcraft, etc.

In FIG. 1, a plurality of composite panels 102 are illustrated along a belly 104 of vehicle 100, although composite panels 102 may be used to form any type of component of vehicle 100, including components that may be subjected to transverse pressure loads during a crash and/or impact. For instance, composite panels 102 along belly 104 of vehicle 100 may be subjected to transverse pressure loads if vehicle 100 were to crash. In the embodiments described herein, composite panel 102 is enhanced to absorb energy during deformation rather than to undergo brittle failure during deformation. The enhancement to composite panels 102 will become readily apparent in the following discussion and figures. Also illustrated in FIG. 1 is that vehicle 100 includes a composite fuel tank 106. For instance, composite fuel tank 106 may include one or more energy absorbing composite panels (e.g., similar in construction to composite panel 102), which surround an internal fuel bladder for vehicle 100 (not shown in FIG. 1). The details of composite fuel tank 106 will be discussed in more detail later.

Figure 2:
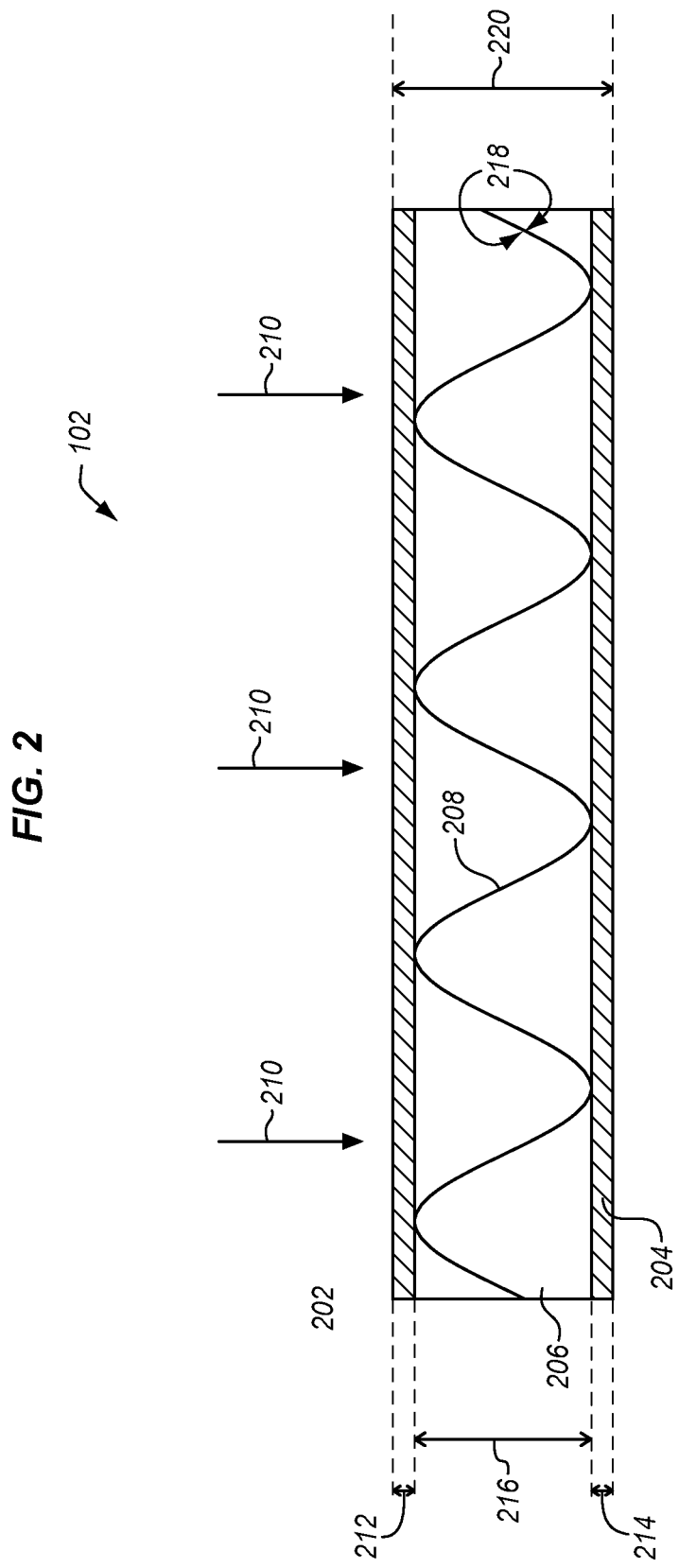
FIG. 2 is a side view of a composite panel in an illustrative embodiment.

FIG. 2 is a side view of composite panel 102 in an illustrative embodiment. In this embodiment, composite panel 102 includes a first composite laminate 202, a second composite laminate 204, and a foam core 206 bonded to and interposed between first composite laminate 202 and second composite laminate 204. First composite laminate 202 and second composite laminate 204 may be referred to as face sheets.

In some embodiments, first composite laminate 202 and second composite laminate 204 may be formed from one or more layers of fiber-reinforced polymer plies. First composite laminate 202 and second composite laminate 204 may include one or more sheets or mats of reinforcing fibrous materials bonded together by a polymer matrix material. The polymer matrix material may include any suitable thermoset resin (e.g., epoxy) or thermoplastic. In some embodiments, first composite laminate 202, second composite laminate 204, and foam core 206 may be consecutively laid up and cured to form composite panel 102. For example, first composite laminate 202 and second composite laminate 204 may include one or more sheets of the reinforcing fibrous material that is pre-impregnated with a polymer matrix material (e.g., a pre-peg), which may be referred to as a dry lay-up. As another example, first composite laminate 202 and second composite laminate 204 may include one or more sheets of the reinforcing fibrous material, and the polymer matrix is applied to the sheet of the reinforcing fibrous material. This may be referred to as a wet lay-up. In addition, the structural properties of first composite laminate 202 and second composite laminate 204 may be defined by the tensile strength of the underlying fibrous materials and the polymer matrix material used to form first composite laminate 202 and second composite laminate 204. In some embodiments, first composite laminate 202 and/or second composite laminate 204 may comprise graphite composite laminates.

Foam core 206 may include any suitable foam material as desired. For example, foam core 206 may include a syntactic foam core material, open or closed cell foam, ballistic foam, etc. In addition, the structural properties of foam core 206 may be defined by the tensile strength of the underlying materials used to form foam core 206.

In this embodiment, composite panel 102 also includes a corrugated core sheet 208 embedded within foam core 206. Corrugated core sheet 208 in this embodiment has a shape of a sine wave, although in other embodiments, corrugated core sheet 208 may have other shapes. Generally, corrugated core sheet 208 has a higher ductility than first composite laminate 202 and second composite laminate 204. For instance, corrugated core sheet 208 may be formed from Polyethylene or Aluminum, which are both highly ductile materials, while first composite laminate 202 and/or second composite laminate 204 may be formed from graphic composites, which have a low ductility. When a transverse pressure load 210 is applied to composite panel 102, composite panel 102 may deform. As composite panel 102 deforms, corrugated core sheet 208 elongates or stretches, which absorbs the energy of transverse pressure load 210. Foam core 206 is also crushed as corrugated core sheet 208 elongates or stretches, which also absorbs the energy of transverse pressure load 210.

Figure 3A:
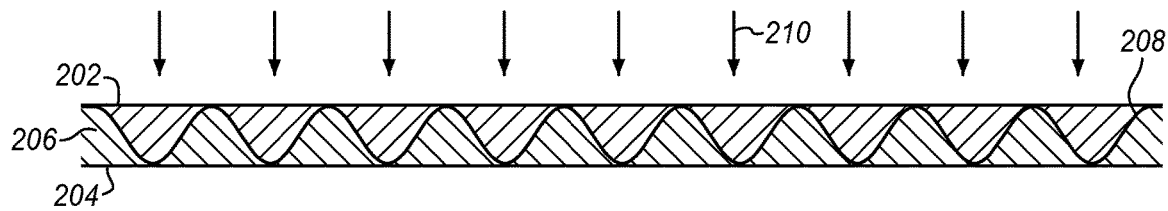
FIGS. 3A-3D illustrate the deformation of the composite panel of FIG. 2 upon the application of a transverse pressure load in an illustrative embodiment.
Figure 3B:
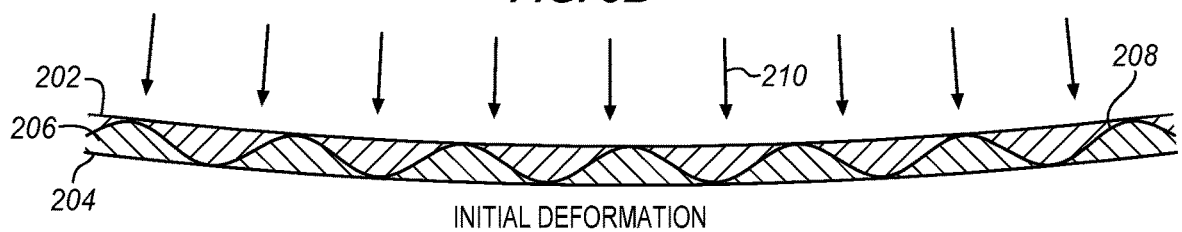
Figure 3C:
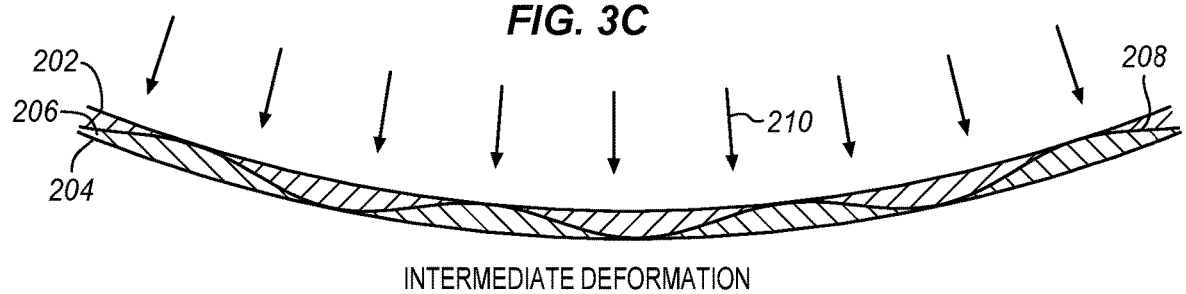
Figure 3D:
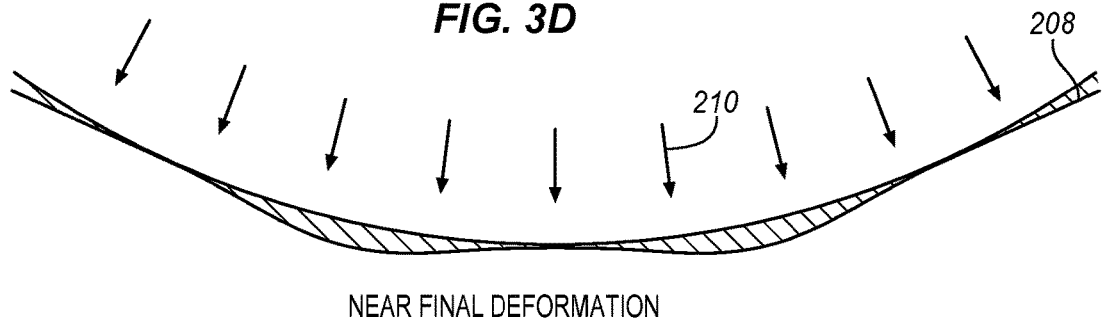

FIGS. 3A-3D illustrates the deformation of composite panel 102 upon application of a transverse pressure load in an illustrative embodiment. FIG. 3A illustrates composite panel 102 prior to deformation. As composite panel 102 starts to deform under the application of transverse pressure load 210, corrugated core sheet 208 begins to elongate or stretch, and foam core 206 begins to crush (see FIG. 3B). The elongation of corrugated core sheet 208 and the crushing of foam core 206 absorbs some of the energy of transverse pressure load 210. As composite panel 102 deforms further, first composite laminate 202 and/or second composite laminate 204 begin to fail (see FIG. 3C). For instance, because first composite laminate 202 and/or second composite laminate 204 are formed from low ductile materials such as graphite composites, first composite laminate 202 and/or second composite laminate 204 may sheer or rupture due to brittle fracture as composite panel 102 deforms. Sheering or rupturing of first composite laminate 202 and/or second composite laminate 204 also absorbs some of the energy of transverse pressure load 210. As composite panel 102 deforms even further, corrugated core sheet 208 continues to elongate, absorbing energy from transverse pressure load 210 (see FIG. 3D).

Referring again to FIG. 2, various features of composite panel 102 may be varied depending on the desired performance of composite panel 102 during deformation. Adjusting a thickness 212 of first composite laminate 202, and/or adjusting a thickness 214 of second composite laminate 204 may allow for the adjustment of the deformation properties of composite panel 102 under the application of transverse pressure load 210. An amplitude 216 and/or a frequency of corrugated core sheet 208 may be varied to adjust how composite panel 102 deforms under the application of transverse pressure load 210. For instance, if amplitude 216 and/or frequency of corrugated core sheet 208 is reduced, then the radius of deformation of composite panel 102 is reduced before corrugated core sheet 208 elongates and/or foam core 206 is crushed. A thickness 218 of corrugated core sheet 208 may be varied to control the ductility of corrugated core sheet 208. Also, the total thickness 220 of composite panel 102 may be varied to adjust how composite panel 102 deforms under the application of transverse pressure load 210.

As discussed previously, one or more composite panels 102 may be interconnected to form a structural component of vehicle 100. For example, the structural component may comprise one or more skin panels along belly 104 of vehicle 100. If vehicle 100 were to crash or be subjected to an impact, composite panel 102 absorbs energy from the crash or the impact, thereby improving the survivability of the occupants of vehicle 100. As composite structures formed from one or more composite panels 102 absorbs energy during deformation rather than shattering or failing catastrophically as would a typical sandwich panel, the performance of vehicle 100 in response to a crash or impact is improved.

In some embodiments, composite panels 102 may be used to form composite fuel tank 106 (see FIG. 1). For instance, composite fuel tank 106 may comprise an internal fuel bladder for vehicle 100, surrounded by composite panels 102. The use of composite panels 102 around an internal fuel bladder for vehicle 100 reduces the likelihood of catastrophic structural failures around the internal fuel bladder of vehicle 100 during crash impacts or ballistic impacts on the internal fuel bladder.

Figure 4:
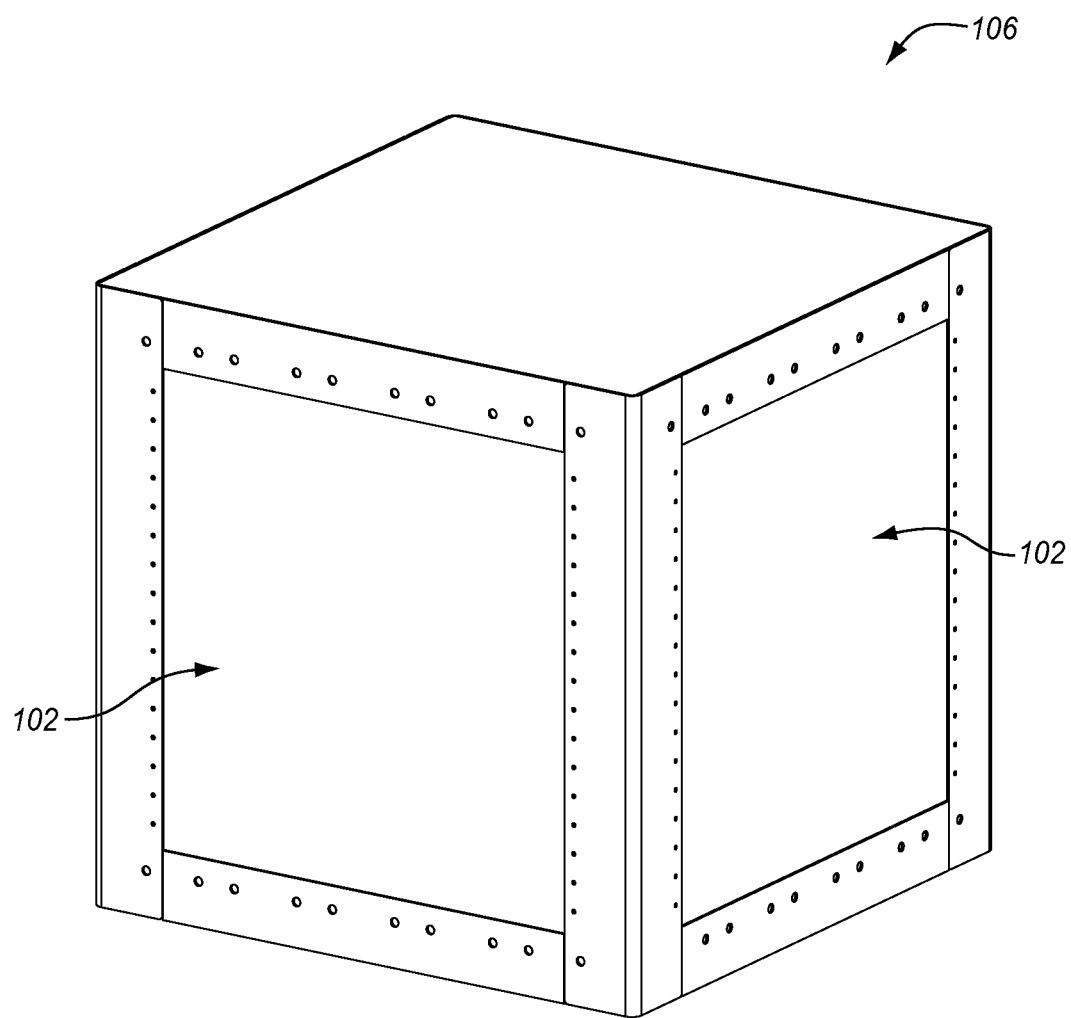
FIG. 4 illustrates a composite fuel tank for the vehicle of FIG. 1 in an illustrative embodiment.

FIG. 4 illustrates composite fuel tank 106 for vehicle 100 in an illustrative embodiment. In this embodiment, an internal fuel bladder (not shown) of vehicle 100 is encapsulated by a plurality of interconnected composite panels 102. The use of composite panels 102 to encapsulate the internal fuel bladder prevents or reduces the chance of catastrophic structural failures around the internal fuel bladder as composite panels 102 deform and absorb energy if vehicle 100 is subjected to a crash or a ballistic impact on the internal fuel bladder 402. This improves the survivability of the occupants of vehicle 100 by eliminating the failure of major load paths which may expose the occupants to potential injuries. For instance, if the internal fuel bladder is hit with a ballistic projectile, then an internal hydrodynamic pressure within the internal fuel bladder is generated which causes the internal fuel bladder to expand, thereby applying pressure on composite panels 102 used to form fuel tank 106. The use of composite panels 102 to surround the internal fuel bladder absorb energy from the internal hydrodynamic pressure, which eliminates the structural failures around fuel tanks that utilize composite panels 102.

Figure 5A:
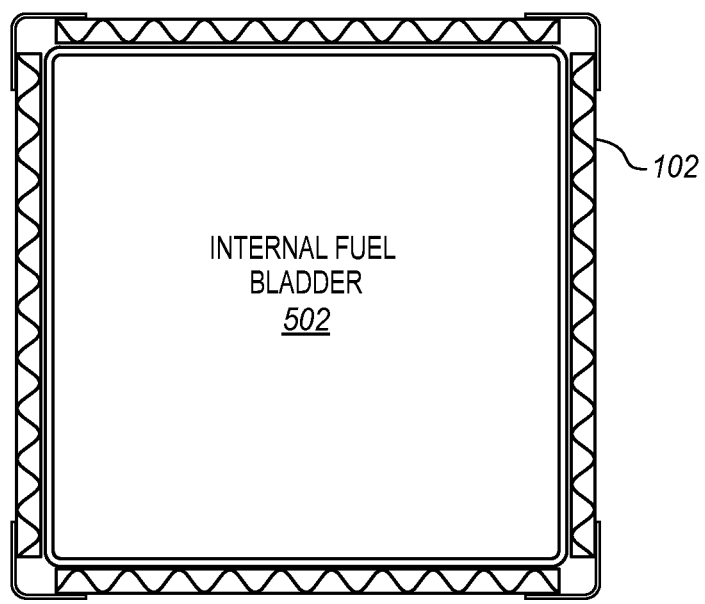
FIGS. 5A-5D illustrate the deformation of a composite fuel tank that utilizes the composite panels of FIG. 2 in an illustrative embodiment.
Figure 5B:
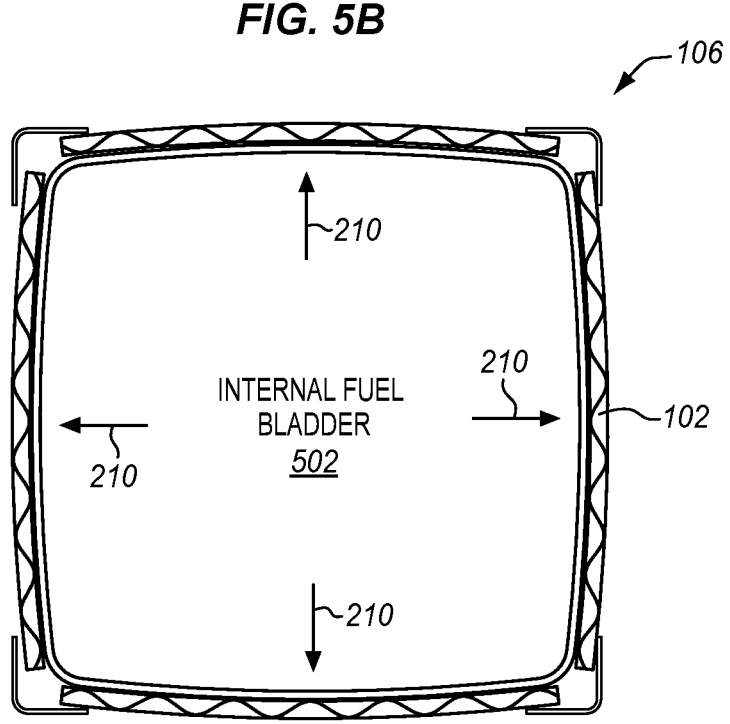
Figure 5C:
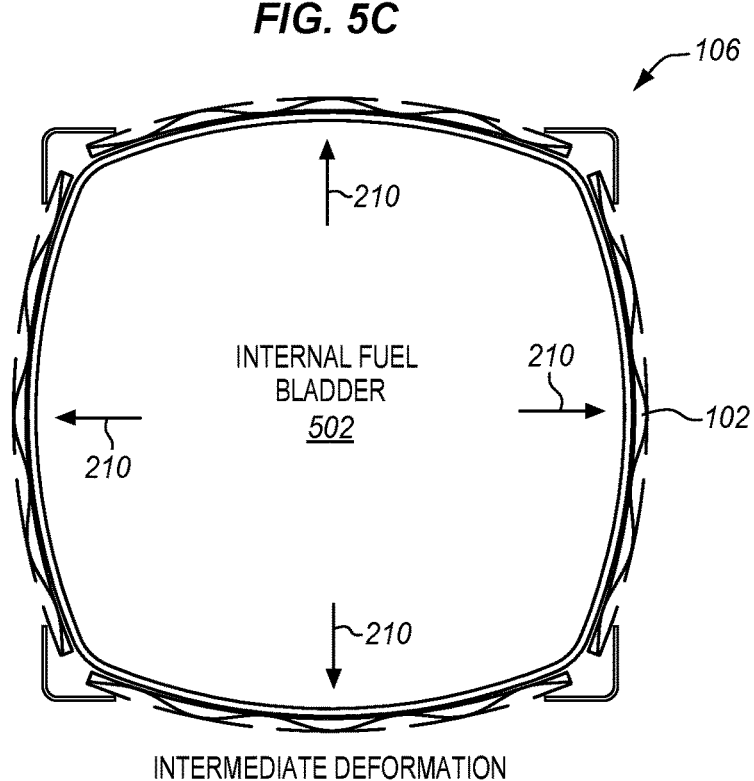
Figure 5D:
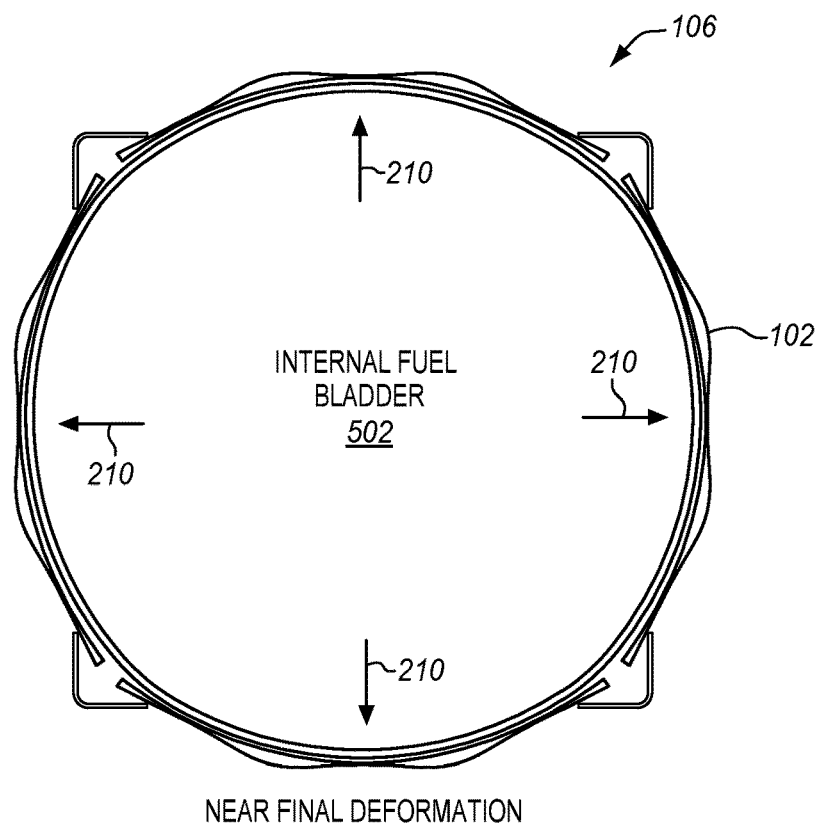
Figure 6:
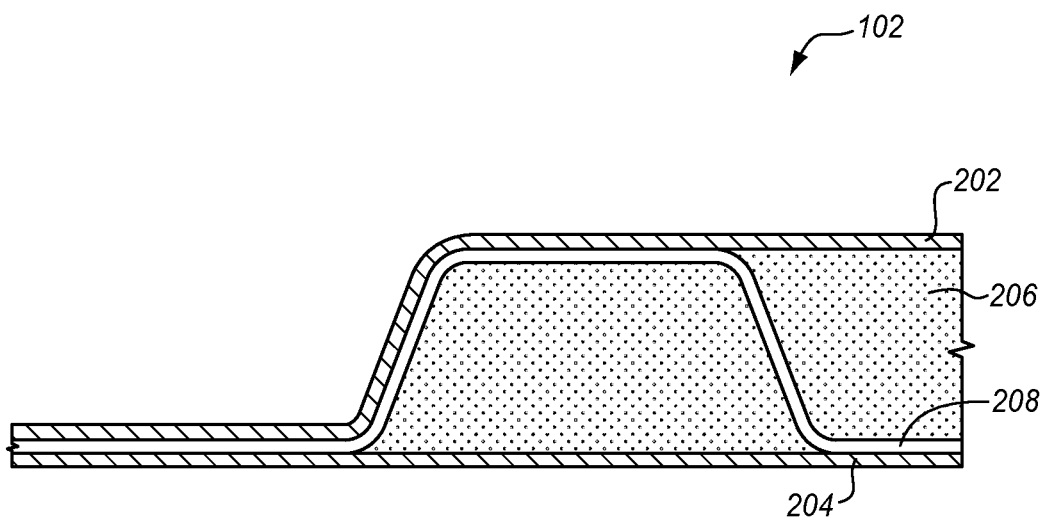
FIG. 6 illustrates an alternate shape for a corrugated core sheet of the composite panel of FIG. 2 in an illustrative embodiment.

FIGS. 5A-5D illustrates the deformation of composite fuel tank 106 upon impact to an internal fuel bladder within composite fuel tank in an illustrative embodiment. The impact to the internal fuel bladder of composite fuel tank 106 may be from a ballistic impact to the internal fuel bladder or from an impact to the internal fuel bladder during a crash of vehicle 100. FIG. 5A illustrates composite fuel tank 106 prior to deformation, with an internal fuel bladder 502 visible in this view. As composite fuel tank 106 starts to deform under hydrodynamic pressure, corrugated core sheet 208 begins to elongate or stretch, and foam core 206 begins to crush (see FIGS. 3B and 5B). The elongation of corrugated core sheet 208 and the crushing of foam core 206 absorbs some of the energy of the hydrodynamic pressure. As composite panel 102 deforms further, first composite laminate 202 and/or second composite laminate 204 begin to fail (see FIGS. 3C and 5C). For instance, because first composite laminate 202 and/or second composite laminate 204 are formed from low ductile materials such as graphite composites, first composite laminate 202 and/or second composite laminate 204 may sheer or rupture due to brittle fracture as composite panel 102 deforms. Sheering or rupturing of first composite laminate 202 and/or second composite laminate 204 also absorbs some of the energy of the hydrodynamic pressure. As composite structure 106 deforms even further, corrugated core sheet 208 continues to elongate, absorbing energy from transverse pressure load 210 (see FIG. 3D).

Although corrugated core sheet 208 may have the shape of a sine wave in some embodiments, other shapes may be used as desired. FIG. 5 illustrates an alternate shape for the corrugated core sheet 208 of composite panel 102 in an illustrative embodiment. In this embodiment, corrugated core sheet 208 has the shape of a hat section. A hat section resembles a hat with steep sides and a flat top.

Although specific embodiments were described herein, the scope is not limited to those specific embodiments. Rather, the scope is defined by the following claims and any equivalents thereof.

What is claimed is:

1. A composite panel, comprising:
    a first composite laminate;
    a second composite laminate;
    a foam core bonded to and interposed between the first composite laminate and the second composite laminate; and
    a corrugated core sheet within the foam core, wherein the corrugated core sheet has a higher ductility than the first composite laminate and the second composite laminate to absorb energy upon a transverse pressure load imposed on the composite panel.

2. The composite panel of claim 1, wherein:
the first composite laminate and the second composite laminate comprise graphite composite laminates; and
the corrugated core sheet comprises polyethylene.

3. The composite panel of claim 1, wherein:
the first composite laminate and the second composite laminate comprise graphite composite laminates; and
the corrugated core sheet comprises aluminum.

4. The composite panel of claim 1, wherein:
a thickness of the corrugated core sheet is selected based on pre-defined capability of composite panel to withstand the transverse pressure load during deformation.

5. The composite panel of claim 1, wherein:
a shape of the corrugated core sheet comprises a sine wave when viewed through a cross-section through a width of the composite panel.

6. The composite panel of claim 5, wherein:
a frequency of the sine wave is selected based on pre-defined capability of the composite panel to withstand the transverse pressure load during deformation.

7. The composite panel of claim 5, wherein:
an amplitude of the sine wave is selected based on pre-defined capability of composite panel to withstand the transverse pressure load during deformation.

8. A composite structure for a vehicle, the composite structure comprising:
a plurality of interconnected composite panels, wherein at least one of the plurality of interconnected composite panels comprises:
a first composite laminate;
a second composite laminate;
a foam core bonded to and interposed between the first composite laminate and the second composite laminate; and
a corrugated core sheet within the foam core, wherein the corrugated core sheet has a higher ductility than the first composite laminate and the second composite laminate to absorb energy upon a transverse pressure load imposed on the at least one of the plurality of interconnected composite panels.

9. The composite structure of claim 8, wherein:
the first composite laminate and the second composite laminate comprise graphite composite laminates; and
the corrugated core sheet comprises polyethylene.

10. The composite structure of claim 8, wherein:
the first and second composite laminate comprise graphite composite laminates; and
the corrugated core sheet comprises aluminum.

11. The composite structure of claim 8, wherein:
a thickness of the corrugated core sheet is selected based on pre-defined capability of the at least one of the plurality of interconnected composite panels to withstand the transverse pressure load during deformation.

12. The composite structure of claim 8, wherein:
the composite structure forms a structural component of a vehicle.

13. The composite structure of claim 8, wherein:
the composite structure encapsulates a fuel bladder of an aircraft.

14. The composite structure of claim 8, wherein:
a shape of the corrugated core sheet comprises a sine wave when viewed through a cross-section of a width of the at least one of the plurality of interconnected composite panels.

15. The composite structure of claim 14, wherein:
a frequency of the sine wave is selected based on pre-defined capability of the at least one of the plurality of interconnected composite panels to withstand the transverse pressure load ding during deformation.

16. The composite structure of claim 14, wherein:
an amplitude of the sine wave is selected based on pre-defined capability of the at least one of the plurality of interconnected composite panels to withstand the transverse pressure load during deformation.

17. A composite fuel tank, comprising:
an internal fuel bladder; and
a composite structure encapsulating the internal fuel bladder, the composite structure comprising:
a plurality of interconnected composite panels, wherein at least one of the plurality of interconnected composite panels comprises:
a first face sheet;
a second face sheet;
a foam core bonded to and interposed between the first face sheet and the second face sheet; and
a corrugated core sheet within the foam core, wherein the corrugated core sheet has a higher ductility than the first face sheet and the second face sheet to absorb energy upon a transverse pressure load imposed on the at least one of the plurality of interconnected composite panels.

18. The composite fuel tank of claim 17, wherein:
the first face sheet and the second face sheet comprise graphite composite laminates; and
the corrugated core sheet comprises polyethylene.

19. The composite fuel tank of claim 17, wherein:
the first face sheet and the second face sheet comprise graphite composite laminates; and
the corrugated core sheet comprises aluminum.

20. The composite fuel tank of claim 17, wherein:
a thickness of the corrugated core sheet is selected based on pre-defined capability of the at least one of the plurality of interconnected composite panels to withstand the transverse pressure load during deformation.

21. The composite fuel tank of claim 17, wherein:
a shape of the corrugated core sheet comprises a sine wave when viewed through a cross-section of a width of the at least one of the plurality of interconnected composite panels.

22. The composite fuel tank of claim 21, wherein:
a frequency of the sine wave is selected based on pre-defined capability of the at least one of the plurality of interconnected composite panels to withstand the transverse pressure load during deformation.

23. The composite fuel tank of claim 21, wherein:
an amplitude of the sine wave is selected based on pre-defined capability of the at least one of the plurality of interconnected composite panels to withstand the transverse pressure load during deformation.

* * * * *